United States Patent [19]

Yamazaki

[11] 4,075,106
[45] Feb. 21, 1978

[54] FILTERING DEVICE

[76] Inventor: Masahiko Yamazaki, 15-2 2-chome, Fujizuka, Kohoku Yokohama, Japan

[21] Appl. No.: 747,046

[22] Filed: Dec. 2, 1976

Related U.S. Application Data

[63] Continuation-in-part of Ser. No. 685,685, May 12, 1976, abandoned.

[30] Foreign Application Priority Data

May 7, 1976    Japan .............................. 51-57411[U]

[51] Int. Cl.² ............................................ B01D 39/18
[52] U.S. Cl. ................................. 210/487; 55/498;
   55/521; 156/291; 156/295; 210/493 R; 210/508
[58] Field of Search ............... 210/483, 484, 486, 487,
   210/488, 492, 497, 493 R, 493 B, 503–506, 508,
   437; 156/291, 295; 55/498, 521, 514

[56] References Cited

U.S. PATENT DOCUMENTS

| | | | |
|---|---|---|---|
| 3,302,796 | 2/1967 | Downey | 210/493 |
| 3,692,184 | 9/1972 | Miller et al. | 210/493 |

FOREIGN PATENT DOCUMENTS

| | | | |
|---|---|---|---|
| 1,072,079 | 1/1953 | France | 210/493 |

*Primary Examiner*—Frank Sever
*Attorney, Agent, or Firm*—Flynn & Frishauf

[57] ABSTRACT

A filtering device comprises a cylindrical member bored with a large number of holes; a sheet-like filter element crosswise folded like bellows and rolled into a cylindrical form so as to concentrically surround the bored cylindrical member and a plurality of thin band-shaped liquid passage plates interposed between every adjacent folded portions of the inner wall of the filter element, and wherein each liquid passage plate has both surfaces made irregular and further its width chosen to be equal to or larger than the height of the projecting folded portion of the sheet-like filter element.

At least one annular support band surrounds the outer periphery of the filter element defined by the apexes of the folded projections. An adhesive applied to the inner peripheral wall of said annular support band permits the support band to hold the folded projections in position and also permeates the apexes of the folded portions, thereby fixing the inner walls of the apexes to the outer edges of the passage plates.

6 Claims, 13 Drawing Figures

FIG. 1
FIG. 2
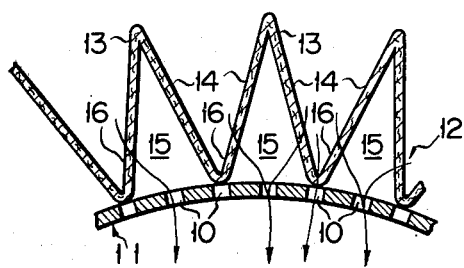
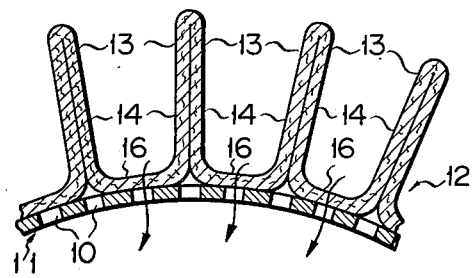
FIG. 3
FIG. 4
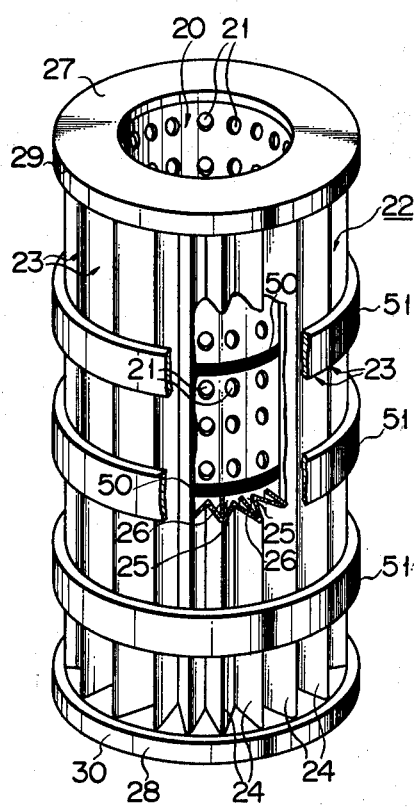
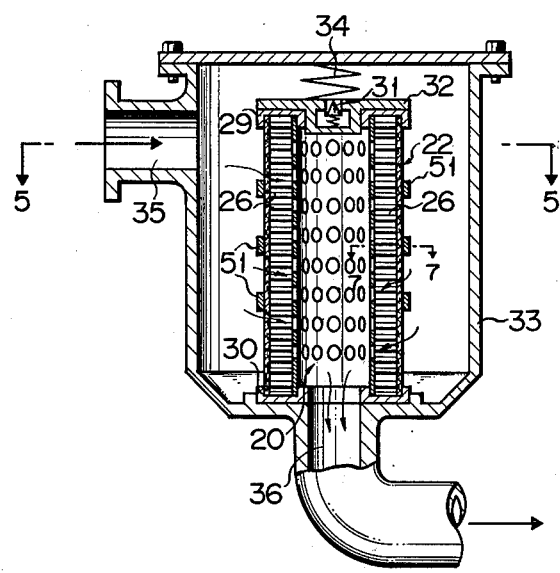
FIG. 5
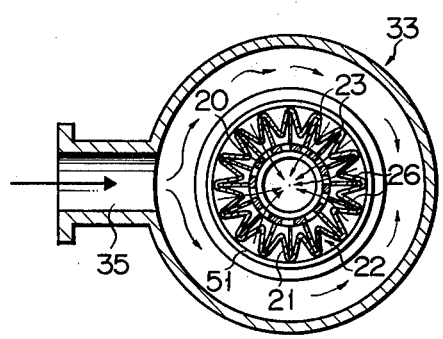

FILTERING DEVICE

CROSS-REFERENCE TO RELATED APPLICATION

This application is a continuation-in-part of U.S. patent application Ser. No. 685,685 filed May 12, 1976, now abandoned.

BACKGROUND OF THE INVENTION

This invention relates to a filtering device and more particularly to a filtering device which comprises a cylindrical member bored with a large number of holes, and a filter element surrounding said cylindrical member, whereby any liquid filtered by the filter element can smoothly flow into the cylindrical member.

With some filtering device of the above-mentioned type, the filter element is folded like bellows to provide an increased area of filtration and rolled to surround a cylindrical member so as to cause the folded portions of said filter member to project in the radial direction of the cylindrical member. A filter element constituting the most important component of the filtering device is a porous flexible sheet generally prepared as is well known, from vegetable fibers such as those of cotton, chemical fibers such as polyester, glass fibers, soft foamed plastics material having continuous cells, or asbestos. FIG. 1 illustrates a known filtering device using such filter element. The prior art filtering device comprises a cylindrical member 11 bored with a large number of holes 10 (only some of which are shown) and a crosswise folded filter element 12 so rolled as to concentrically surround the cylindrical member 11. Numerous folded portions 13 of the filter element 12 prepared from any of the aforesaid materials project outwardly in the radial direction of the cylindrical member 11. Each projecting folded portion of the filter element 12 has a pair of oppositely inclined side walls 14 which jointly define an interior space 15 having a substantially triangular cross section. While passing from the outside of the projecting folded portion 13 into the interior thereof, a liquid is filtered, and the filtrate passes through the interior space 15 and holes 10 into the cylindrical member 11. While duct contained in the liquid is little deposited on the filter element 12 in the initial stage of filtration, liquid pressure is uniformly applied to the entire outer wall of the filter element 12, enabling the projecting folded portion 13 of the filter element 12 to be left open as shown in FIG. 1, and in consequence the liquid to pass through the whole filtration surface. Where, however, deposition of dust in the root region 16 defined between every adjacent projecting folded portions 13 leads to unbalanced liquid pressure (this event takes place relatively early during filtration), then the mutually facing side walls 14 of the projecting folded portion 13 are tightly pressed against each other with the resultant loss of the interior space 15. As the result, the fibers of one side wall 14 tightly interdigitate with those of the other side wall 14 to close up filtering spaces between the respective fibers, substantially obstructing the filtration of the liquid through the mutually pressed side walls 14 of the projecting folded portion 13, said filtration being only allowed in the root region 16. However, the root region 16 having an extremely smaller filtration area than the entire outer surface of the filter element 12 is quickly coated with dust. Once such an undesirable event as shown in FIG. 2 arises, a sharp decline occurs in the filtering capacity of a filtering device, giving rise to a considerable loss of pressure therein. With the prior art filtering device of the above-mentioned type, therefore, a plugged filter element must be exchanged for a fresh one in a short time.

To eliminate the drawbacks of the conventional filtering device, there have been proposed various methods of, for example, reinforcing the filter element with plastics material, or folding both filter element and a wire net together. These prior art methods proposed for resolution of difficulties encountered in the past have a common characteristic of rendering the filter element stiff or mechanically strong, but are still accompanied with the drawbacks that the filter element is manufactured by a complicated process at high cost and moreover has to be folded at fewer points than otherwise, namely, is unavoidably decreased in filtering area.

SUMMARY OF THE INVENTION

It is accordingly the object of this invention to provide a filtering device admitting of easy and inexpensive manufacture which effectively carries out filtration even when both side walls of the respective projecting folded portions of a filter element are tightly pressed against each other, as previously described, due to deposition of dust, and can maintain a large amount of folded projections in a state most adapted for filtration.

BRIEF DESCRIPTION OF THE DRAWING

FIG. 1 is an enlarged cross sectional view of a prior art filtering device during the initial stage of operation;

FIG. 2 is an enlarged cross sectional view of the prior art filtering device during the later stage of operation in which both side walls of the respective folded portions of the filter element are tightly pressed against each other due to deposition of dust on said side walls;

FIG. 3 is a fractional exploded oblique view of a filtering device embodying this invention;

FIG. 4 is a longitudinal sectional view of the filtering device of the invention placed in a liquid reservoir;

FIG. 5 is a sectional view on line 5—5 of FIG. 4;

DETAILED DESCRIPTION

Figure 6:
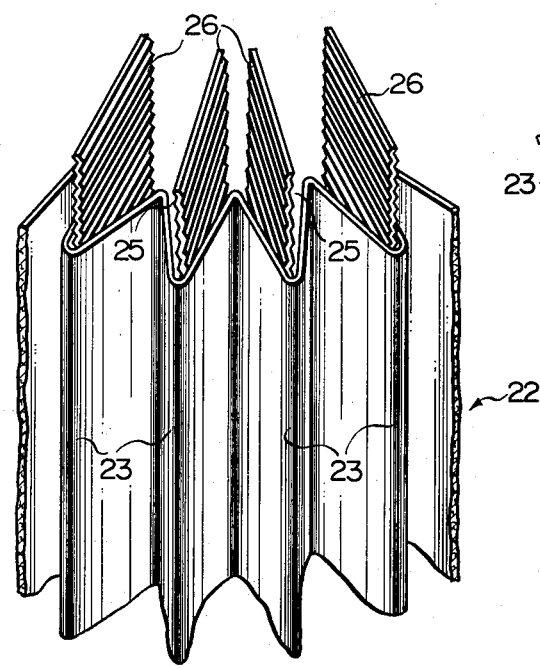
FIG. 6 is an enlarged oblique view showing liquid passage plates inserted into every folded portion of the filter element rolled to surround a cylindrical member so as to project outwardly in the radial direction of a cylindrical member.

A filtering device embodying this invention comprises, as shown in FIGS. 3 to 5, a cylindrical member 20 made of metal such as aluminium or steel, bored with a large number of holes 21, and surrounded by a filter element 22. According to this embodiment, the filter element 22 is a porous, composite flexible sheet formed of a layer of cotton fibers laminated with that of polyester fibers. Obviously, the filter element need not be prepared from any of these materials, but may consist of any others of the previously listed known components, depending on the condition under which the subject filtering device is applied. The filter element 22 is rolled to surround a cylindrical member 20 and is folded in zigzag fashion so as to form a large number of bellows-like folded portions 23 projecting outwardly in the radial direction of the cylindrical member 20 (for convenience of illustration, only a small number of said folded portions are shown). Each of the radially projecting bellows-liked folded portions 23 has a pair of oppositely inclined side walls 24, which jointly define an interior space 25. When the filter element 22 is rolled up, the oppositely inclined side walls 24 of the terminal folded portions 23 at both ends of said filter element 22 are connected together by fixing means (not shown) so as to cause said filter element 22 to present a substantially cylindrical form. The total area of all the side walls 24 of the filter element 22 constitute an area of filtration. A thin band-shaped liquid passage plate 26 is inserted into the space 25 defined in every bellows-like folded portion 23. One lateral edge of the liquid passage plate 26 abuts against the inner wall of the edge or apex of the folded portion 23 (FIG. 6) and the other lateral edge of said liquid passage plate 26 is passed against the outer peripheral wall of the cylindrical member 20. Thus the numerous liquid passage plates 26 support the radially projecting folded portions 23 around the cylindrical member 20. The upper and lower ends of the cylindrical member are fitted with annular flange-like end plates 27, 28 fringed with upright portions 29, 30 which also support the filter element 22. The upper and lower ends of the rolled cylindrical filter element 22 is bonded to the inner flat walls of the flange-like end plates 27, 28, and have the apical portions of both upper and lower ends tightly fitted to the inside of the annular upright fringe portions 29, 30 of the end plates 27, 28.

With a filtering device, the filter element is generally demanded to be provided with as many projections as possible to increase a filtering area. However, a larger number of folded projections naturally require the filter element and passage plates to have a smaller thickness, causing the passage plates and folded projections to be flexed by liquid pressure. Thus, the outer surfaces of the adjacent projections may be pressed against each other, probably resulting in the failure of filtration at said mutually pressed portions of the folded projections. To eliminate such difficulties, therefore, the filtering device of this invention is provided with means for preventing the folded projections and passage plates from being flexed thereby to support them in a normal condition.

Figure 7:
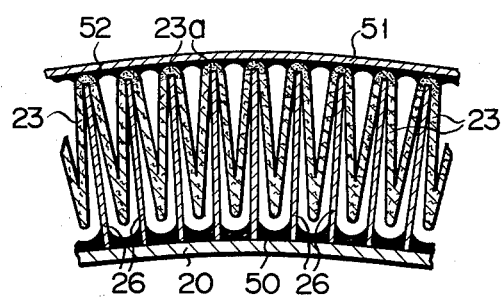
FIG. 7 is an enlarged cross sectional view on line 7—7 of FIG. 4, showing the condition in which the filter element is supported around the cylindrical member.

As seen from FIGS. 3 and 7, an adhesive agent 50 prepared from a heat resistant resin such as epoxy resin, or fluorine-base resin is applied on the outer peripheral surface of the cylindrical member 20 in the form of, for example, three (only two indicated in FIG. 3) annular bands properly spaced from each other in the lengthwise direction of said member 20. The inner edge portions of the passage plates 26 are fixed to the cylindrical member 20 by the adhesive agent 50 applied to said three annular bands. The adhesive agent 50 lying between the adjacent passage plates 26 not only tightly secures said plates 26 to the cylindrical member, but also acts as a spacer for preventing them from being drawn near to each other. The folded projections of the filter element 22 are surrounded by a plurality of (for example, three) annular support bands 51 formed of substantially inextensible porous strips such as these of kraft paper or cloth which are spaced from each other in the lengthwise direction of the cylindrical member 20. The inner wall of the annular support bands 51 is coated with an adhesive 52 prepared from the same kind of the previously mentioned adhesive 50. The apical portions of the folded projections 23 are fixed to the bands 51 by the adhesive 52. Since the filter element 22 is porous, the adhesive 52 is carried into the V-shaped apical portions 23a (FIG. 7) of the folded projections 23, thereby fixing the outer edge of the passage plates 26 to the inner wall of the apical portions 23a. When hardened, the adhesive 52 brought into the apical portions 23a (represented by numerous dots in FIG. 7) fixes the apical portions 23a in the V-shape, thereby causing the apical portions 23 mechanically to support the passage plates 26. Therefore, this invention enables the filter element provided with numerous folded portions to be effectively maintained in a normal state by simple means.

A cover plate 32 provided with a known relief valve 31 (FIG. 4) is fixed in liquid tightness to the upper end plate 27. The filtering device constructed as described above is received in a reservoir 33 of the known type in a state pressed against the inner bottom wall of the reservoir 33 by means of a compression spring 34. The reservoir 33 is provided with an inlet 35 through which to send a liquid into the reservoir 33 and an outlet 36 through which to draw out the liquid therefrom. The upper end of the reservoir 33 is covered with a lid 37. A liquid, for example, oil is carried into the reservoir 33 through the inlet 35, filtered by the filter element 22, brought into the cylindrical member 22 through the holes 21, and finally discharged through the outlet 36. While the oil is strained by the filter element 22, dust contained in the oil is trapped by the filter element 22.

Figure 8:
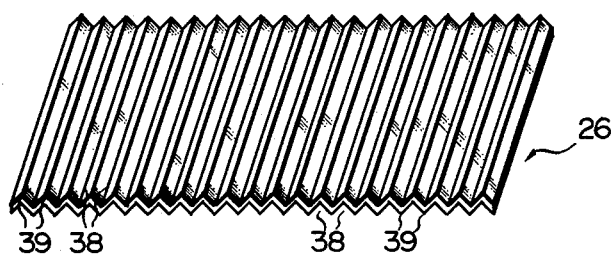
FIG. 8 is an oblique view of the liquid passage plate of FIG. 6.
Figure 9:
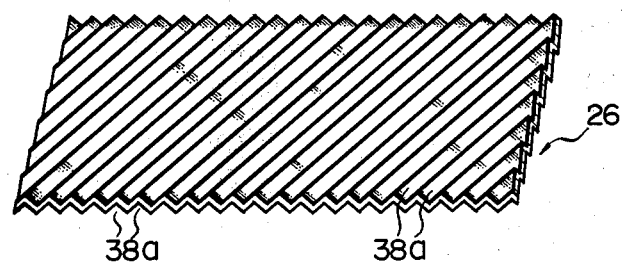
FIGS. 9 and 10 set forth different modifications of the liquid passage plate of FIG. 7.
Figure 10:
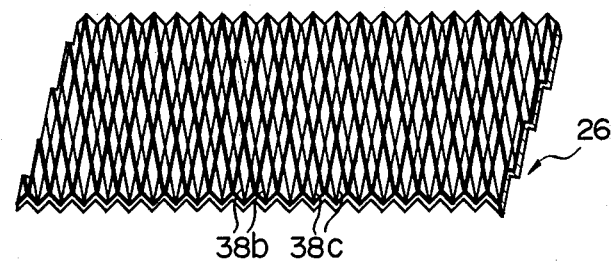

The liquid passage plate 26 is made thin enough to enable the filter element 22 to be folded like bellows in as large a number of projections 23 as possible. Both surfaces of the liquid passage plate 26 are provided with a great many convex and concave portions. In the case of this embodiment, numerous parallel grooves 38 and ridges 39 are formed by a knurling tool of the known type on both surfaces of the aluminium liquid passage plate 26 (as shown in FIG. 8). The grooves 38 and ridges 39 extend exactly across the passage plate 26, but may be arranged, as shown, in FIG. 7, obliquely to the longitudinal axis of the passage plate 26. Or as shown in FIG. 10, two mutually intersecting groups 38b, 38c of grooves may be formed obliquely to the longitudinal axis of the liquid passage plate 26. Or the liquid passage plate 26 may be formed of any other hard material such as hard molded plastics plate, hardened double-sided sand paper or sintered metal plate, provided the surface of any of these materials has numerous irregularities.

What is important for the liquid passage plate 26 is that first, when the liquid passage plate 26 is pressed against the rolled filter element 22 surrounding the cylindrical member 20, a free space or passage continuously extending from one lateral edge of the liquid passage plate 26 to the other lateral edge thereof is formed between the liquid passage plate 26 and filter element 22; and secondly, the liquid passage plate 26 has a width equal to or larger than the height of each of the bellows-like folded portions of the filter element 22 projecting outwardly in the radial direction of the cylindrical member 20. These requisites will be later described.

Figure 11:
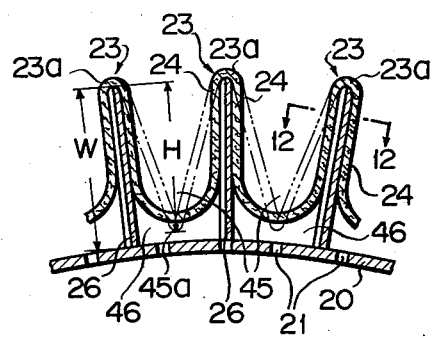
FIG. 11 is a fractional cross sectional view of the liquid passage plates of the invention pressed against the inner side walls of the respective projecting folded portions of the filter element.
Figure 12:
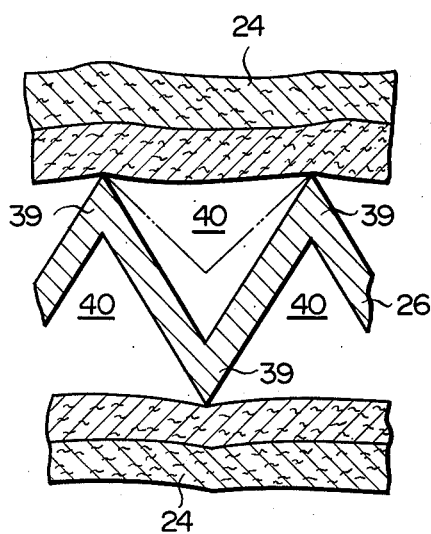
FIG. 12 is an enlarged cross sectional view on line 12—12 of FIG. 11.

When dust begins to be trapped by the filter element 22 with the progress of filtration, the mutually facing inclined side walls 24 of the projecting folded portions 23 of the filter element 22 are pressed against the intervening passage plate 26 by the pressure of a liquid, for example, oil passing through the filter element 22 (FIGS. 11 and 12). At this time, the closely arranged parallel ridges 39 of the passage plate 26 support the side walls 24 of the projecting folded portion 23 of the filter element 22 in such a manner that free spaces 40 (FIG. 12) for the passage of a liquid are formed between the passage plate 26 and the side walls 24 of the projecting folded portion 23 of the filter element 22. Since the free space 40 continuously extends from one lateral edge of the passage plate 26 to the other lateral edge thereof, a liquid which has passed through any part of the side walls 24 of the projecting bellows-like folded portions 23 can smoothly flow into the cylindrical member 20. All the free spaces 40 are chosen to have a sufficiently large total cross sectional area for the free flow of a liquid. Therefore, the side walls 24 of the respective bellows-like folded portions 23 of the filter element 22 can filter the liquid with little loss of its pressure throughout the side walls 24. Further, the side walls 24 supported by the closely arranged ridges 39 of the liquid passage plate 26 are little subject to flexure and indicate greater resistance to liquid pressure. Generally, the larger the cross sectional area of the space 40, the smaller the loss of liquid pressure. Though a space 40 having a greater depth is more advantageous, the greater depth results in an increase in the thickness of the passage plate 26 and necessarily a decrease in the number of the projecting folded portions 23 of the filter element 22. On the other hand, a shallow space 40 allows the passage plate 26 to be thin, but leads to a decline in the cross sectional area of the space 40 and undesirably more loss of liquid pressure in the space 40. Therefore, the depth of the space 40 should be determined in consideration of the above-mentioned two opposite characteristic of a filtering device as well as of the flexibility of a filter element 22 used.

Figure 13:
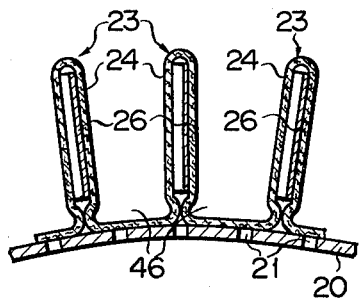
FIG. 13 is a fractional cross sectional view, showing the operating condition of liquid passage plates having a smaller width than the height of the radially projecting folded portions of the filter element.

For the object of the invention, the liquid passage plate 20 is required to have a width W equal to or larger than a distance between the inner wall 23a of the edge or apex of the projecting folded portion 23 of the filter element 22 and the outer wall 45a of the edge or bottom of the root region 45 defined between every adjacent projecting folded portions 23 (said distance is hereinafter referred to as "the height H of the projecting folded portion"). This requisite is one of the important characteristics of this invention. The reason is that where the passage plate 26 has a smaller width than the height of the projecting folded portion 23 of the filter element 22 as shown in FIG. 13, then those portions of the inner side walls 24 of the folded portion 23 which are not separated by the intervening passage plate 26 are directly pressed against each other. These mutually pressed portions of the inner side walls 24 shut off the aforesaid free space 40 from the cylindrical member 20, substantially obstructing the filtration of a liquid through the projecting folded portion 23. In such case, a liquid can only be filtered through the root region 45 defined between every adjacent projecting folded portions 23 as through the root region 16 (FIG. 2) in the prior art filter element 12, resulting in the considerably decreased filtering capacity of the filter element 23 of this invention.

In contrast, where the passage plate 26 has a width, as shown in FIG. 11, equal to or larger than the height H of the projecting folded portion 23, then the inner side walls 24 of the projecting folded portion 23 are not directly pressed against each other at all, because they are fully separated by the intervening passage plate 26. Therefore, the free space 40 of the passage plate 26 never fails to be opened to an empty area 46 allowed between the filter element 22 and cylindrical member 20, enabling the whole surface of the side walls 24 of the projecting folded portion 23 constantly to carry out highly efficient filtration, even when said walls 24 are tightly attached to the passage plate 26.

Where the side walls 24 of the projecting folded portion 23 are pressed against each other as shown in FIG. 11, the edge or apex of said folded portion 23 seems to be possibly broken by a stress exerted by the lateral edge of the passage plate 26 inserted into said edge or apex of the projecting folded portion 23. Actually, however, tight attachment is frictionally established by liquid pressure between both inner side walls 24 of the projecting folded portion 23 and both irregular surfaces of the passage plate 26. Therefore, a stress possibly applied to the apex of the projecting folded portion 23 is dispersed throughout the inner side walls 24 abutting against the passage plate 26, thereby eliminating the above-mentioned possibility of the apex of the projecting folded portion 23 being split in two. Further, when solidified, the adhesive agent 52 carried into the apical portions 23a mechanically reinforces said apical portions 23a.

As numerically indicated, the parts of the filtering device embodying this invention has the following measurements. The upright filter element 22 which is designed to trap dust 3 to 4 microns or over in size is about 1 mm thick and about 200 mm high and is further provided with 52 projecting bellows-liked folded portions 23 each about 12 mm high. The passage plate 26 is a band-shaped aluminium sheet 195 mm long, 13 mm wide and 0.3 mm thick provided with a large number of crosswise extending V-shaped grooves 38 defining an angle of 60° or 90°. The apex of the ridge 39 on one side of the passage plate 26 is spaced 0.6 to 0.7 mm, as perpendicularly measured, from that on the other side of said plate 26.

It will be noted that the above-mentioned measurements are indicated only by way of illustration and that this invention can be practised in any other modification.

What is claimed is:

1. In a filtering device having a cylindrical member with a large number of holes therein and a flexible sheet-like porous filter element surrounding the cylindrical member, said filter element being folded in zigzag fashion so as to present a plurality of radially crosswise extending projections and root regions defined between every two adjacent projections, the improvement comprising:

a large number of rigid passage plates each interposed between the inner edge of the radially crosswise extending projections and the outer wall of the cylindrical member, said passage plates being provided with a plurality of convex and concave portions on both sides thereof and having a width equal to or larger than a distance between the inner wall of the apex of the projecting folded portion of the filter element and the outer wall of the bottom of the root region defined between every adjacent projecting folded portions, and at least one annular support band surrounding and contacting substantially only the apexes of the folded projections and having its inner wall coated with an adhesive, which provides means to fix said apexes to said support band, said adhesive permeating through the apexes of said folded projections to further provide means to fix said apexes to the outer edge of the passage plates.

2. The filtering device according to claim 1, wherein the cylindrical member is provided with at least one annular band of adhesive which surrounds the outer peripheral surface of the cylindrical member to thereby fix the inner edge of the passage plates to the cylindrical member.

3. The filtering device according to claim 2, wherein each passage plate has both sides provided with a plurality number of alternately arranged parallel ridges and grooves.

4. The filtering device according to claim 3, wherein the ridges and grooves extend fully across the passage plate.

5. The filtering device according to claim 2, wherein the passage plates have both sides thereof knurled.

6. The filtering device according to claim 1, wherein the respective apexes of the folded projections contain at least one portion which has a V-shaped cross section and is hardened by intrusion of said adhesive.

* * * * *